UNITED STATES PATENT OFFICE.

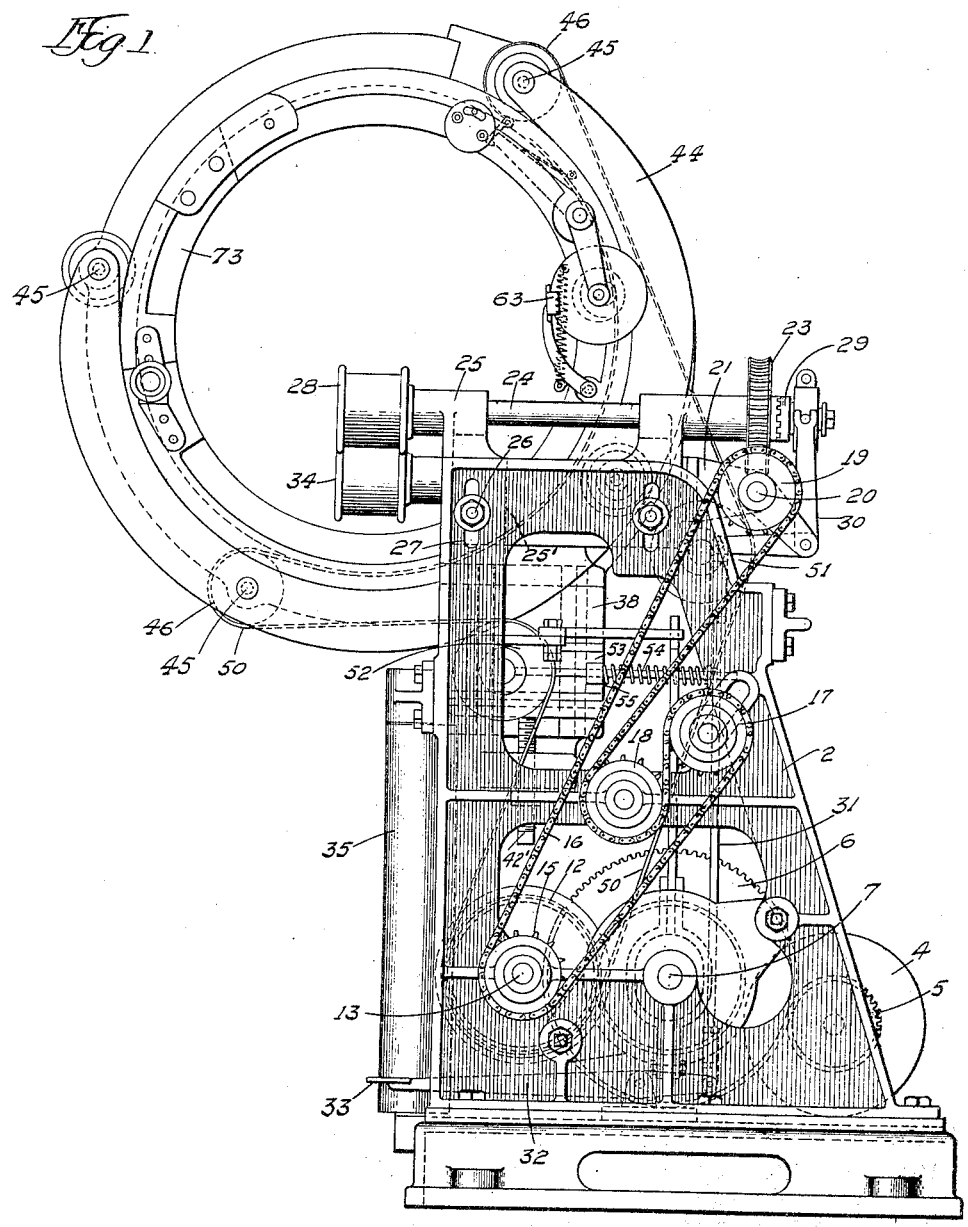

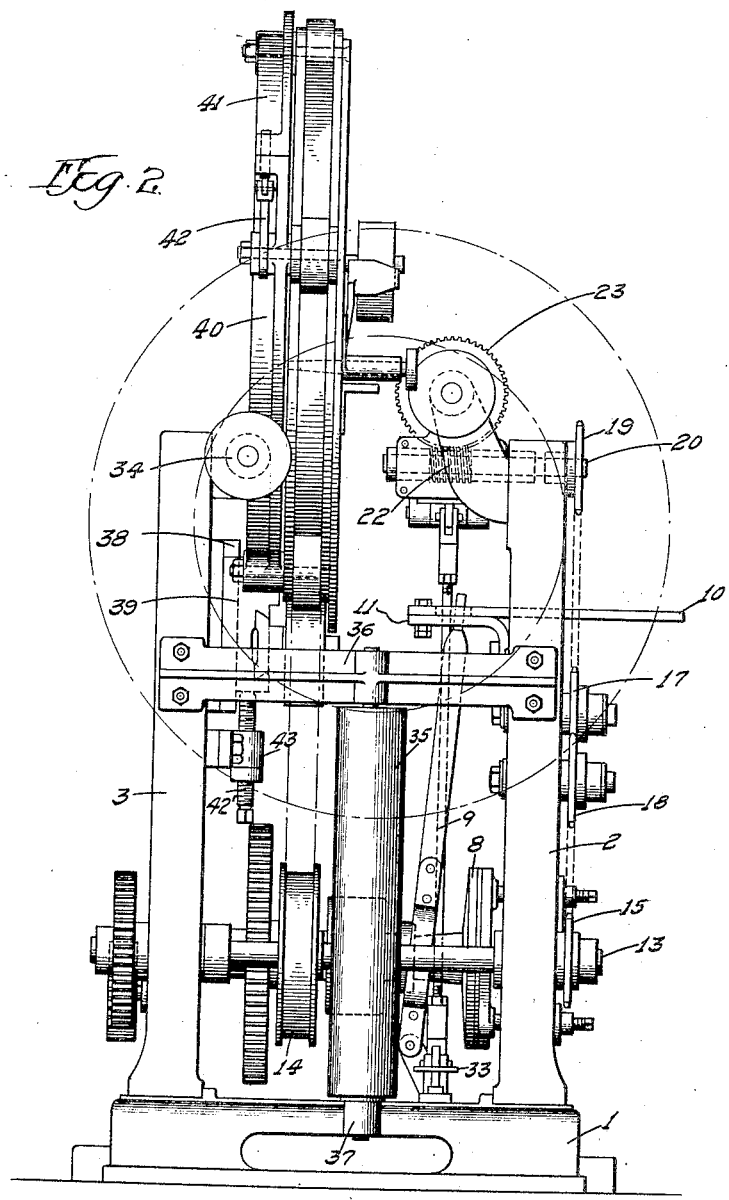

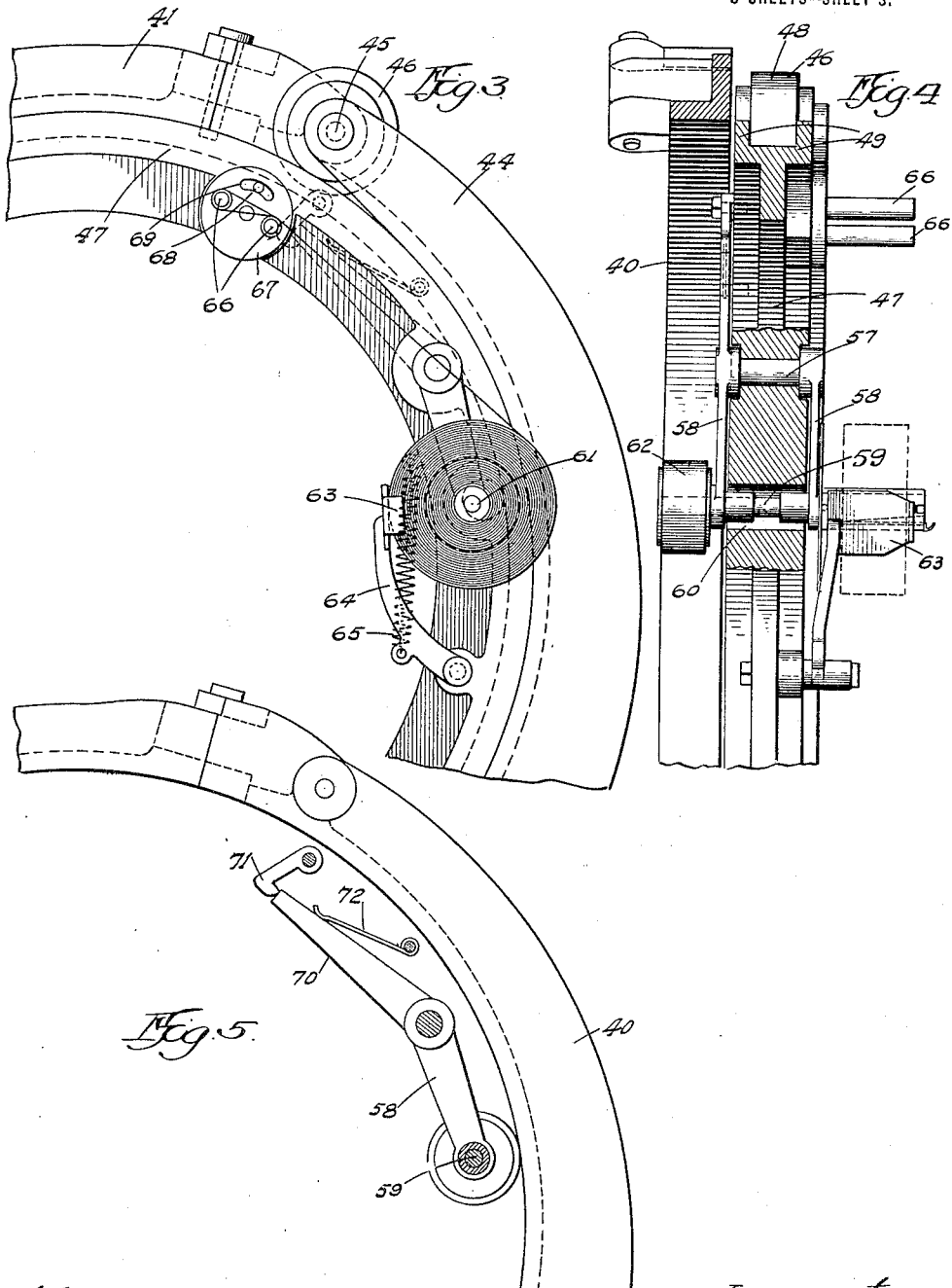

WILLIAM C. STEVENS, OF SUMMIT COUNTY, OHIO, ASSIGNOR TO THE FIRESTONE TIRE & RUBBER COMPANY, OF AKRON, OHIO, A CORPORATION OF OHIO.

WRAPPING AND UNWRAPPING MACHINE.

1,395,063.   Specification of Letters Patent.   Patented Oct. 25, 1921.

Application filed November 19, 1917. Serial No. 202,765.

*To all whom it may concern:*

Be it known that I, WILLIAM C. STEVENS, a citizen of the United States, residing in the county of Summit, State of Ohio, have invented certain new and useful Improvements in Wrapping and Unwrapping Machines, of which the following is a specification.

In the manufacture of pneumatic tires one of the methods of vulcanization is known as the "two-cure" process, in which a tread strip is applied after the principal portion of the casing has been partially cured, and is then wrapped with cloth and the whole casing given its final cure. The machine constituting the subject of this invention is designed to wrap the tires and to unwrap them after being cured, only a slight adjustment being necessary to change the function of the machine.

In the drawings accompanying this application I have illustrated one embodiment of the machine, in which:

Figure 1 is a side elevation,

Fig. 2 is an end view,

Fig. 3 is a fragmentary view of a portion of the shuttle,

Fig. 4 is an end elevation of the parts shown in Fig. 3, partly in section, and

Fig. 5 is a fragmentary view of the spool carrying arm in position for rewinding the wrapper.

The machine is carried on a base plate 1, at either side of which rise approximately A-shaped standards 2 and 3 which support the operating parts of the machine. The machine is driven by a motor or other source of power which is indicated by the numeral 4 carrying a pinion 5 in mesh with gear 6 on the main shaft 7 of the machine. Any suitable clutch mechanism may be carried on the shaft 7, this part being indicated by the numeral 8 operated by lever 9 which in turn is operated by a hand lever 10 pivoted in a bracket 11. Through the clutch mechanism, by suitable gearing 12, a countershaft 13 is rotated, which carries a pulley 14 and also a sprocket wheel 15.

As is usual in machines of this character there are two main elements, the core or tire carrying and rotating elements and the shuttle or wrapping supply, these two parts being so arranged that they rotate in interlocking relation.

The tire carrying and rotating element of the machine will first be described.

About the sprocket wheel 15 there is carried a chain 16 which passes over an adjustable idler sprocket 17, thence over a second idler 18 and finally over a driven sprocket 19, fastened to the end of a worm shaft 20 carried in a bracket 21 secured to the upper end of the standard 2. The shaft 20 carries a worm 22 which drives a worm gear 23 at one end of a shaft 24, which is mounted for rotation in parallel bearings 25 carried on a plate 25' which is secured to the upper inside surface of the standard 2 by bolts 26 passing through slots 27 in the standard. At the forward end of the shaft 24 is carried a flanged roller 28 which supports the core and tire in position to be wrapped and by the rotation of which the core and tire may be revolved. By means of the slots 27 the plate 25' can be adjusted vertically so that tires of different sizes may be presented to the wrapping shuttle at the exact center. The worm gear 23 is loosely mounted on the shaft 24 but may be connected in driving relation by a clutch 29 which may be operated by a bell crank 30 pivoted in the bracket 21 and connected by a link 31 to a foot lever 32 carrying a pedal 33. An auxiliary supporting roller 34 which runs idly is mounted on the upper end of standard 3. A vertical guide or steadying roller 35 is carried at its upper end in a tie-plate 36 joining the standards 2 and 3, the lower end being supported on a bearing 37 in the front of the base-plate.

On the inner face of the standard 3 is formed a vertical dove-tail guideway 38, on which is slidably mounted a plate 39 depending from a circular bearing plate 40 having a swinging portion 41 adapted to be held in closed position by a pin and lock 42 of any well-known construction. The inner side of the bearing plate 40 and the swinging portion 41 is formed smooth so as to present an endless track for purposes to be presently described. A set screw 42' is arranged in a bracket 43 on the side of the standard 3 and serves to support the bearing plate in any position of vertical adjustment. A second bearing plate 44 in the form of a three-quarter circle is arranged opposite to the plate 40 and connected with it by pins 45. On the pins 45 are carried rollers 46 which support the shuttle or wrapper-carrier, designated generally by the numeral 47. The rollers have enlarged central portions as shown at 48, which are received between flanges 49 on the outer periphery of the shuttle. A belt 50 passes from the pulley 14 over an idler 51 and thence over the upper roller 46 and adjacent the outer periphery of the shuttle between the flanges 49 and around the lower roller 46, and thence over an adjusting idler pulley 52 to the pulley 14. By means of the belt the shuttle may be rapidly rotated in one plane while the core and tire are being rotated in a plane at right angles to it. The roller 52 is carried on a horizontally movable slide 53 which is carried on the plate 39, a rod 54 being connected to the slide and extended rearwardly therefrom and through a boss 55 on the plate 39. A coil-spring 56 is arranged about the rod and serves to urge the pulley 52 inwardly, thus maintaining the proper tension on the belt and automatically regulating the tension of the belt when the shuttle carrier and supporting rollers are adjusted relative to one another.

At one point of the shuttle is pivotally mounted a stub shaft 57 in one direction from which extends a pair of parallel arms 58 in the ends of which is mounted a rotatable spool shaft 59, which passes through an enlarged aperture 60 in the shuttle. One end of the shaft 59 is designed to carry and turn with the wrapping spool 61, and the other end to carry a pulley 62 arranged to travel over the inside of the bearing plate 40. This pulley 62 is covered with leather, or other suitable substance, which will suffice to drive the pulley as it passes over the track. A friction brake 63 is arranged to bear upon the surface of the roll of fabric being carried on the end of a pivoted lever 64 and held against the surface of the roll by a spring 65. From the roll the fabric in the wrapping operation passes over a pair of tensioning pins 66 which are carried on a circular plate 67, pivotally mounted on the shuttle and secured in correct position of adjustment by a bolt 68, operating in an arcuate slot 69. One of the arms 58, preferably the one on the same side as the pulley 62, is extended in direction on the opposite side of the pivot 57 as shown at 70, the end of the arm being adapted to be engaged by a swinging hook 71. The purpose of the hook is to hold the arm in the position shown in Fig. 3 when the machine is being used as a wrapping machine, in which position the pulley 62 is out of contact with the track 40, and the spool is, therefore, free to unwind as required for wrapping purposes. When it is desired to use the machine for unwrapping, the hook 71 is released and the arm 58 moves about its pivot under the influence of the spring 72 until the pulley contacts with the track 40. When this is done the arm 64 carrying the brake 63 is removed from operative position either by a complete removal from the shuttle or by swinging it back until it is in position past the center, whereupon the spring will hold it away from the spool.

The shuttle is provided with a segment 73 which is adapted to be swung inwardly or sidewise of the main position in order to allow the tire to be placed in the machine, the movable segment being brought into line with the movable portion 41 of the track and the gap between the ends of the plate 44 when it is desired to insert or remove the tire.

It is believed that the operation of the machine will be clear from the description so far given. The tire carriers 28 and 34 having been adjusted to the proper height by the bolts 26 and slots 27 and the shuttle carrier being adjusted by the bolt 42', the machine is opened to receive a tire which is desired to be wrapped, being placed for this purpose on the rollers 28 and 34. The leading end of the fabric is brought from the spool through the tension pins and attached to the end of the tire. The clutch 8 being in idle or non-driving relation is thrown in by the hand-lever 10 and the machine is started. If desired the clutch 29 may be open, in which case a few turns of cloth may be laid over the core and then the treadle 33 is depressed and the core is rotated. The combined rotation of the shuttle and tire serves to lay up the wrapping in superposed coils. If it is desired to unwrap a tire, the roller 62 is brought in contact with the track 40 by releasing the hook 71 and the brake 63 is removed from contact with the spool, as has been explained. The leading end of the wrapping is attached to the spool and the machine is reversed. As the shuttle rotates the spool operates to remove the wrapping, the pulley 62 allowing the spool to slip to accommodate the increase of diameter as the spool builds up.

It is obvious that various changes and modifications may be made in the machine without departing from the principles of the invention or sacrificing any of its benefits.

I claim:

1. In a machine of the character described, the combination of a carrier for an object to be wrapped or unwrapped, means to rotate the object, a shuttle rotating in a plane at right angles to the plane of the object, a bearing plate for said shuttle having a circular track, a pivoted support on the shuttle, a spool holder on said support, a pulley connected with said spool holder, means adapted to rock said support to bring said pulley in contact with the track, and a locking member adapted to hold said support with the pulley out of contact with the track.

2. In a machine of the character described, the combination of an object supporting and rotating means, a stationary support, a smooth circular track carried by said support, a movable spool holder arm, a spool shaft carried on said arm, a friction drive pulley connected with the spool shaft, means to maintain the pulley out of contact with said track or to force it into contact therewith.

WILLIAM C. STEVENS.